United States Patent [19]

Downs et al.

[11] Patent Number: 5,481,932
[45] Date of Patent: Jan. 9, 1996

[54] MULTI-AXIS COUNTERSHAFT POWER TRANSMISSION

[75] Inventors: Robert C. Downs, Clarkston; John D. Malloy, Troy, both of Mich.

[73] Assignees: General Motors Corporation, Detroit; Saturn Corporation, Troy, both of Mich.

[21] Appl. No.: 219,311

[22] Filed: Mar. 29, 1994

[51] Int. Cl.⁶ .................................................. F16H 3/08
[52] U.S. Cl. ....................................... 74/331; 74/325
[58] Field of Search ............................ 74/325, 331, 333

[56] References Cited

U.S. PATENT DOCUMENTS

| | | | |
|---|---|---|---|
| 4,033,200 | 7/1977 | Stockton | 74/325 X |
| 4,034,620 | 7/1977 | McNamara et al. | 74/325 X |
| 4,063,464 | 12/1977 | Crabb | 74/331 |
| 4,640,146 | 2/1987 | Buback | 74/333 X |
| 4,718,295 | 1/1988 | Jesena | 74/368 |
| 4,864,881 | 9/1989 | Beeson et al. | 74/331 X |
| 5,186,065 | 2/1993 | Downs | 74/331 |

*Primary Examiner*—Rodney H. Bonck
*Assistant Examiner*—Peter Kwon
*Attorney, Agent, or Firm*—Donald F. Scherer

[57] ABSTRACT

A power transmission has three axes on which rotatably supported gears and selectively operable clutches are disposed to provide five forward speed ratios. The two highest speed ratios (fourth and fifth) have identical input clutch and gear units. The fourth ratio, the torque transmission path, includes a transfer gear ratio and utilizes the second speed ratio gears to develop a speed ratio different from the fifth speed ratio.

5 Claims, 2 Drawing Sheets

MULTI-AXIS COUNTERSHAFT POWER TRANSMISSION

TECHNICAL FIELD

This invention relates to countershaft type transmissions, and more particularly, to such transmission utilizing hydraulically actuated friction clutches to select the desired gear ratios.

BACKGROUND OF THE INVENTION

Multi-axis automatically shifting power transmissions utilize fluid operated input clutches and associated gearing to provide a plurality of power paths between an input shaft and an output shaft. Each input clutch is operable to connect a gear member to one of the shafts which meshes with a gear member rotatably fixed to another of the shafts. The ratio selected is delivered to an output differential from the output shaft of the transmission.

In order to increase the number of forward gear ratios, it is generally necessary to increase the number of gear meshes on the shafts between the input and output. The increased gear meshes will result in increased overall length of the transmission. This may not be a problem for rear wheel drive type vehicles. However, for transversely disposed from wheel drive transmissions, when the transmission is on the engine axis, the number of gear meshes is an important item. The number of gear meshes will effect the overall length of the transmission and therefore the space required between the drive wheels. Thus, it becomes necessary to either use a chain drop to get the transmission axis off of the engine axis or utilize fewer gear ratios and an engine with a larger operating span to its torque curve.

SUMMARY OF THE INVENTION

The present invention seeks to increase the number of gear ratios in a transmission without increasing the overall length of the transmission. This is accomplished by utilizing a secondary or transfer shaft which will transfer the added ratio input from the input gear to the output shaft through a ratio gearing that is already present within the transmission. The basic transmission which is to be improved has a synchronizer assembly for forward and reverse, such that one of the input clutches can be utilized for a forward gear and for a reverse ratio. This is a common type of implementation in the countershaft power transmissions.

The axial space taken up by the synchronizer assembly is only utilized for the synchronizer collar range of movement. Thus, the axial space on one shaft is vacant. The present invention takes advantage of that space by adding a transfer gear which will couple the transfer shaft back through the forward drive ratio on the input gear and thence to the output shaft. This will permit the input gear ratio for the fourth and fifth ratios to be identical. The fourth gear ratio is increased from the input gear set by the transfer gearing and the other forward ratio that is utilized. In the particular system to be later discussed, the forward ratio is the second ratio which will be utilized in combination with the fourth ratio.

It is an object of this invention to provide an improved power transmission having parallel ratio transmitting shafts, wherein the input shaft to each of the shafts is identical for at least two of the forward ratios.

It is another object of this invention to provide an improved multi-speed ratio parallel shaft power transmission, wherein two of the forward ratios have identical input structures and one of the two ratios is further changed by utilizing another of the forward ratios to transmit the power to the output shaft.

These and other objects and advantages of the present invention will be more apparent from the following description and drawings.

DESCRIPTION OF THE PREFERRED EMBODIMENT

Figure 1:
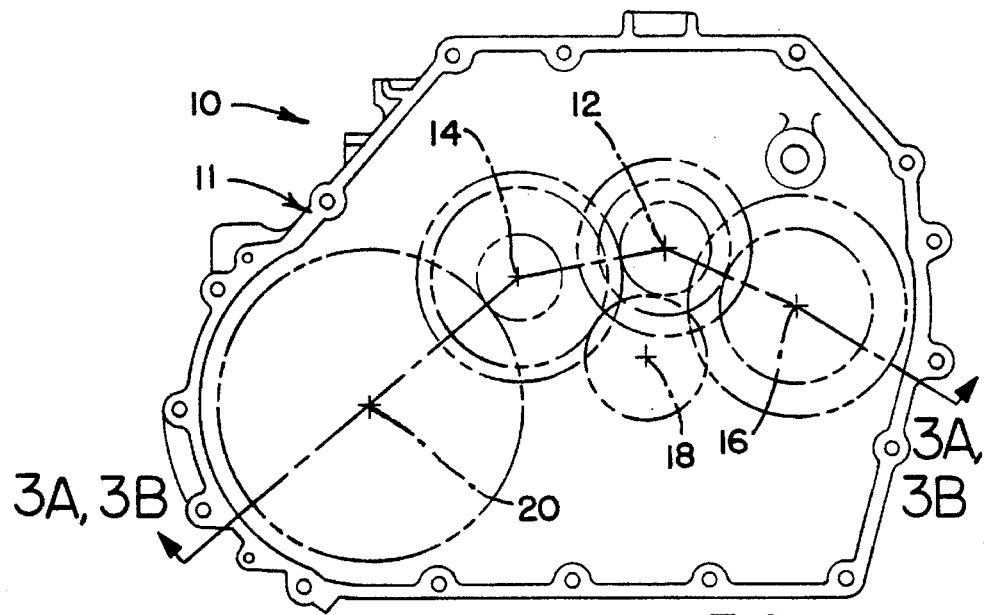
FIG. 1 is a diagrammatic end view of a transmission incorporating the present invention.
Figure 2:
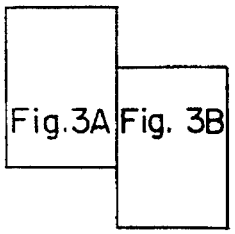
FIG. 2 is a diagrammatic representation showing the layout of FIGS. 3A and 3B.

As seen in FIG. 1, a transmission 10 has a housing 11 in which a plurality of axes are provided; namely, an input axis 12, an output axis 14, a secondary axis 16, a reverse idler axis 18 and a differential output axis 20. Each of these axes are supported in conventional bearing members, and it is not believed that a further description of these support members is required at this point.

Figure 3A:
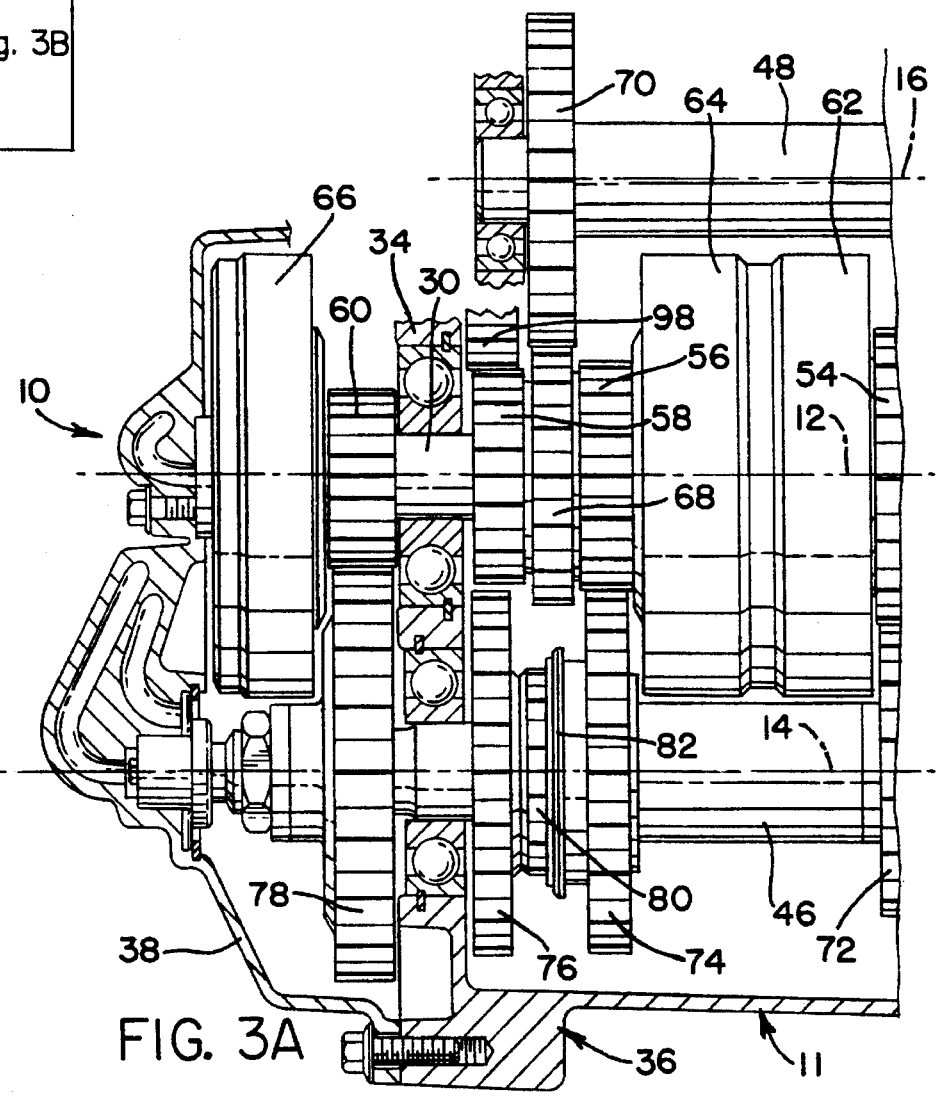
FIGS. 3A and 3B are a cross-sectional elevational view of a power transmission incorporating the present invention.
Figure 3B:
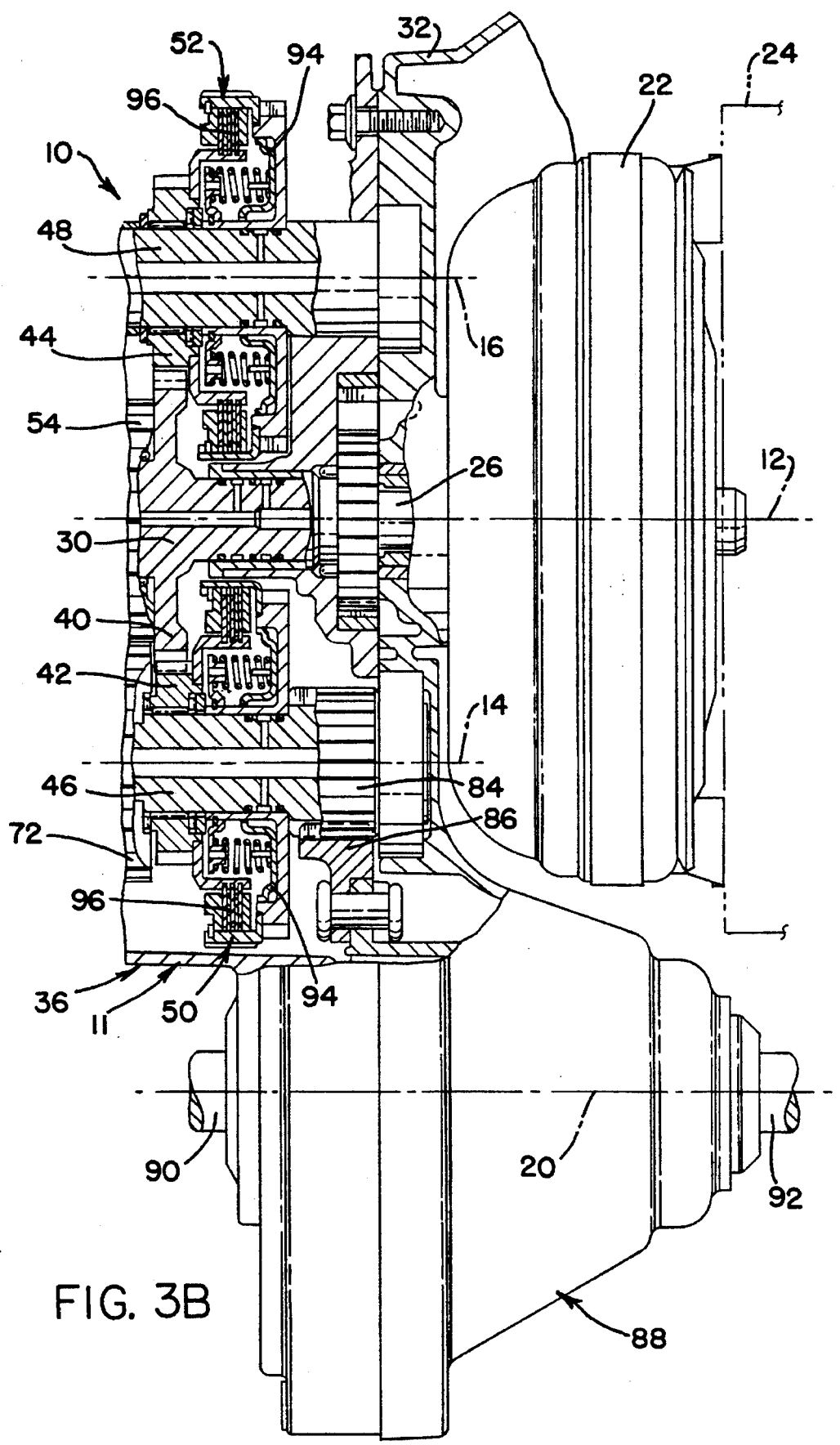

As seen in FIGS. 3A and 3B, the input axis 12 has supported thereon a torque converter 22 which is driven by an internal combustion engine 24. This is a conventional input drive system for a power transmission. The torque converter 22 has an input shaft 26 which is operable to provide power to a conventional internal/external type gear pump which is effective to supply pressurized fluid for control over the various friction clutches in the transmission.

The input axis 12 also has supported thereon an input shaft 30 which extends from a front cover 32 to a support wall 34. The support wall 34 is a portion of a housing 36 in which gear and clutch elements of the transmission 10 are disposed. The housing 36 is closed by an end cover 38 at the rear end wall. The input shaft 30 has secured thereto a fourth and fifth ratio input gear 40 which meshes with a fifth ratio output gear 42 and fourth ratio intermediate gear 44. The fifth ratio output gear 42 is rotatably supported on a transmission output shaft 46 and the fourth ratio intermediate gear 44 is rotatably supported on a secondary or transfer shaft 48. A fluid operated clutch 50 is effective to connect the gear 42 to the output shaft 46 and a fluid operated clutch 52 is effective to connect the fourth ratio intermediate gear 44 to the transfer shaft 48.

The input shaft 30 also has rotatably supported thereon a third ratio input gear 54, a second ratio input gear 56, a reverse ratio input gear 58 and a first ratio input gear 60. The gears 54, 56 and 60 are each operatively connected with selectively engageable fluid operated friction clutch members 62, 64 and 66, respectively. The reverse input gear 58 and the second input gear 56 are secured together as a cluster gear and are spaced by a fourth ratio transfer gear 68 which meshes with a fourth ratio transfer gear 70 secured to the secondary shaft 48.

The output shaft 46 has secured thereto a third ratio output gear 72 and rotatably supported thereon a second ratio output gear 74 and a reverse output gear 76. A first ratio output gear 78 is also drivingly connected with the output shaft 46. The second ratio output gear 74 and reverse output gear 76 are connectible selectively with the output shaft 46 by a conventional synchronizer or mechanical clutch 80 which is selectively engaged by a sleeve 82 in a well known manner to connect either gear 74 or gear 76 with the output shaft 46.

The axial space taken up by the synchronizer clutch 80 is disposed longitudinally opposite the space taken up by the fourth ratio transfer gears 68 and 70. Thus, these gears 68 and 70 do not add to the overall axial length of the transmission since the space for the synchronizer clutch 80 is already present.

The output shaft 46 has secured or otherwise drivingly connected thereto an output gear member 84 which meshes with a differential input gear 86 which in turn drives a conventional differential 88 to provide output drive to differential output shafts 90 and 92 in a well known manner.

The clutches 50 and 52 are identical in construction, as are the gears 42 and 44. The clutches are conventional fluid operated type clutches, each of which have a piston 94 which is effective to enforce engagement between friction plates 96 to thereby provide a drive connection between the respective shafts 46 and 48 and the gears 42 and 44. When clutch 50 is energized or engaged, the gear 42 will provide a drive path from gear 40 on the input shaft 30 to the output gear 84 and thence to the differential 88. This is the fifth and highest gear ratio within the system.

When the clutch 52 is engaged, the gear ratio or drive path will be from gear 40 to gear 44 and the transfer shaft 48 via clutch 52. Transfer shaft 48 will cause rotation of the transfer gear 70 and therefore transfer gear 68. The transfer gear 68 being secured with the second ratio input gear 56 will cause rotation of that gear member, which in turn will drive the second ratio output gear 74 which is connected with the output shaft 46 via the synchronizer clutch 80. The output shaft 46, as previously mentioned, drives the output gear 84 and therefore input to the differential 88.

The other gear ratios are accomplished by selective engagement of clutch 66 for first gear, clutch 64 for second gear and clutch 62 for third gear. The reverse ratio is accomplished by moving the synchronizer clutch 80 to the reverse position, such that gear 76 is connected to the output shaft 46. With the engagement of clutch 64, the drive path will be from the input shaft 30 to gear 58 and then through an idler gear 98 to the reverse output gear 76 which is drivingly connected through the synchronizer 80 with the output shaft 46.

It should be apparent from the above description that a transmission providing five forward speed ratios has been assembled in the same axial length as a transmission providing four forward speed ratios. In other words, if the fourth ratio and its attendant transfer gearing is not used, the transmission will be a four speed power transmission of the same axial length. By incorporating the fourth forward ratio into the second and fifth forward ratios, an additional speed ratio is provided without an increase in axial length of the transmission.

In one actual installation, it is proposed to provide a fifth gear speed ratio (input speed over output speed) of 0.581. Thus, the input speed ratio from the input shaft 30 to either shaft 48 or 46, depending upon which clutch 50 or 52 is engaged, would provide a drive or speed ratio of 0.581. The second gear ratio provided by gears 56 and 74 is equal to 1.76. Thus, the 0.581 ratio is multiplied by the 1.76 ratio to increase the fourth gear ratio from the fifth gear ratio. The fourth gear ratio can be further affected by the ratio of the transfer gears 70 and 68.

In the preferred embodiment, it has been found that an overdrive ratio of 0.789 from shaft 48 to the second gear input 56 is preferred. Thus, the fourth ratio is equal to the product of the fifth gear ratio 0.581; the transfer gear ratio 0.789 and the second gear ratio of 1.76. The product of these numbers yields a gear ratio of approximately 0.807.

It should be apparent that a great deal of latitude can now be utilized in a transmission by effectively moving the fourth gear ratio to the desired location between third and fifth. As a general rule, the third ratio in the transmission would be a 1:1 or direct drive ratio. However, this also can be modified to match a desired power system. Therefore, the present invention not only provides for an additional ratio within a fixed axial length system, but also provides a great deal of versatility for the ratio spread that can be obtained within this power system.

The embodiments of the invention in which an exclusive property or privilege is claimed are defined as follows:

1. A multi-speed ratio parallel shaft power transmission comprising:

an input shaft;

an output shaft;

a secondary shaft;

speed ratio establishing means including a plurality of gear members and clutch means selectively connectible between said input shaft and said output shaft for providing a plurality of speed ratios therebetween including a first forward speed ratio, a second forward speed ratio and a reverse speed ratio, mechanical clutch means for connecting selective gear means to one of said input and output shafts and a transfer gear means rotatably supported on the other of said input and output shafts in substantial axial alignment with a portion of said mechanical clutch;

a forward ratio gear and clutch means operatively connectible with said secondary shaft including first gear means meshing with the gear means providing the first forward speed ratio, second gear means meshing with the transfer gear means, and selectively engageable clutch means for establishing a third forward speed ratio of lesser value than said first forward speed ratio and greater value than said second forward speed ratio; and said first forward speed ratio is defined between said input shaft and said output shaft, said third forward speed ratio is partially defined between said input shaft and said secondary shaft at a ratio equal to the first forward speed ratio.

2. A multi-speed ratio parallel shaft power transmission comprising:

an input shaft;

an output shaft;

a secondary shaft;

speed ratio establishing means including a plurality of gear members and clutch means selectively connectible between said input shaft and said output shaft for providing a plurality of speed ratios therebetween including a first forward speed ratio, a second forward speed ratio and a reverse speed ratio, mechanical clutch means for connecting selective gear means to one of said input and output shafts and a transfer gear means rotatably supported on the other of said input and output shafts in substantial axial alignment with a portion of said mechanical clutch;

a forward ratio gear and clutch means operatively connectible with said secondary shaft including first gear means meshing with the gear means providing the first forward speed ratio, second gear means meshing with the transfer gear means, and selectively engageable clutch means for establishing a third forward speed ratio of lesser value than said first forward speed ratio and greater value than said second forward speed ratio;

said mechanical clutch means is effective to selectively establish the reverse speed ratio and the second speed ratio in cooperation with the selective engagement of one of said clutch means; and another of the gear members and clutch means is effective to establish a fourth forward speed ratio of greater value than said second forward speed ratio and of lesser value than said third forward speed ratio.

3. The multi-speed ratio parallel shat power transmission defined in claim 1 wherein said third forward speed ratio is partially defined by the gear means of the second forward speed ratio.

4. The multi-speed ratio parallel shaft power transmission defined in claim 2 wherein the first forward speed ratio is defined between said input shaft and said output shaft, said third forward speed ratio is partially defined between said input shaft and said secondary shaft at a ratio equal to the first forward speed ratio.

5. The multi-speed ratio parallel shaft power transmission defined in claim 4 wherein said third forward speed ratio is partially defined by the gear means of the second forward speed ratio.

* * * * *